(12) United States Patent
Chorn (10) Patent No.: US 10,718,208 B2
(45) Date of Patent: Jul. 21, 2020

(54) RANKING DRILLING LOCATIONS AMONG SHALE PLAYS

(71) Applicant: Landmark Graphics Corporation, Houston, TX (US)

(72) Inventor: Larry Gregg Chorn, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 172 days.

(21) Appl. No.: 15/038,251

(22) PCT Filed: Mar. 12, 2014

(86) PCT No.: PCT/US2014/024596
§ 371 (c)(1),
(2) Date: May 20, 2016

(87) PCT Pub. No.: WO2015/137943
PCT Pub. Date: Sep. 17, 2015

(65) Prior Publication Data
US 2016/0290129 A1    Oct. 6, 2016

(51) Int. Cl.
*E21B 49/00* (2006.01)
*E21B 44/00* (2006.01)
(Continued)

(52) U.S. Cl.
CPC .......... *E21B 49/00* (2013.01); *E21B 41/0092* (2013.01); *E21B 44/00* (2013.01);
(Continued)

(58) Field of Classification Search
None
See application file for complete search history.

(56) References Cited

U.S. PATENT DOCUMENTS

| 7,963,327 B1 | 6/2011 | Saleri et al. | |
| 2004/0100264 A1* | 5/2004 | Martin | E21B 49/00 324/346 |

(Continued)

FOREIGN PATENT DOCUMENTS

| CA | 2818464 A1 | 12/2013 |
| WO | WO-2015137943 A1 | 9/2015 |

OTHER PUBLICATIONS

Mireault, Ray; et al., "Reservoir Engineering for Geologists", Canadian Society of Petroleum Geologists, 2013, pp. 1-57.*

(Continued)

*Primary Examiner* — Lina M Cordero (57) ABSTRACT

In some embodiments, an apparatus and a system, as well as a method and an article, may operate to access rock property measurements taken within shale basins; to transform the rock property measurements into Estimated Ultimate Recovery (EUR) estimates for wells operating within the shale basins, the EUR estimates being further based on values for shale thickness, porosity, and hydrocarbon saturation measured within the shale basins; to generate metrics for ranking drilling locations, the drilling locations including wells for which the EUR estimates were generated; and to provide drilling coordinates to control a drilling instrument for recovering shale basin resources in the drilling locations according to the ranked list. Additional apparatus, systems, and methods are disclosed.

19 Claims, 10 Drawing Sheets

(51) Int. Cl.
  *E21B 47/00* (2012.01)
  *E21B 41/00* (2006.01)
  *G01V 1/40* (2006.01)
  *G01V 99/00* (2009.01)

(52) U.S. Cl.
  CPC ............... *E21B 47/00* (2013.01); *G01V 1/40* (2013.01); *G01V 99/005* (2013.01)

(56) References Cited

U.S. PATENT DOCUMENTS

| | | | |
|---|---|---|---|
| 2005/0149307 A1* | 7/2005 | Gurpinar | E21B 43/00 703/10 |
| 2008/0157584 A1 | 7/2008 | Kieschnick | |
| 2011/0264430 A1* | 10/2011 | Tapscott | G01V 99/00 703/10 |
| 2013/0110524 A1 | 5/2013 | Saleri et al. | |
| 2013/0238304 A1* | 9/2013 | Glinsky | G06F 17/5009 703/6 |
| 2013/0262069 A1 | 10/2013 | Leonard | |
| 2013/0346040 A1* | 12/2013 | Morales German | G06F 17/5009 703/2 |
| 2014/0100797 A1* | 4/2014 | Acharya | G01N 33/0031 702/24 |
| 2015/0153476 A1* | 6/2015 | Prange | E21B 43/00 703/2 |
| 2015/0371345 A1* | 12/2015 | Jeffers | E21B 43/00 705/7.25 |
| 2016/0047942 A1 | 2/2016 | Chorn et al. | |
| 2016/0102541 A1* | 4/2016 | Kronenberger | E21B 44/00 73/152.18 |
| 2016/0281480 A1* | 9/2016 | Pyecroft | E21B 43/305 |

OTHER PUBLICATIONS

"Australian Application Serial No. 2014386296, Examination Report dated Sep. 9, 2016", 2 pgs.

Chorn, Larry, et al., "Identification of Shale Sweet Spots Using Key Property Estimates from Log Analysis and Geostatistics", SPE 168772 / URTeC 1580188, *Unconventional Resources Technology Conference*, Aug. 12-14, 2013, (2013), 1-13.

Chorn, Larry, et al., "Shale Play Development Program Using Risk-Reward Mapping from Geospatial Analyses", SPE 166130, *SPE Annual Technical Conference and Exibition* held in New Orleans, Louisiana, USA, Sep. 30-Oct. 2, 2013, (2013), 1-10.

Okouma, V, et al., "Estimated Ultimate Recovery (EUR) as a Function of Production Practices in the Haynesville Shale", SPE 147623, *SPE Annual Technical Conference and Exhibition*, (2011), 1-13.

"International Application Serial No. PCT/US2014/024596, International Search Report dated Dec. 12, 2014", 3 pgs.

"International Application Serial No. PCT/US2014/024596, Written Opinion dated Dec. 12, 2014", 6 pgs.

Mason, James E, "Well Production Profiles for the Fayetteville Shale Gas Play", Oil and Gas Journal, (Apr. 1, 2011), 1-15.

Okouma, V, et al., "Estimated Ultimate Recovery (EUR) as a Function of Production Practices in the Haynesville Shale", In: SPE Annual Technical Conference and Exhibition, (2011), 1-13.

European Patent Office, Supplementary European Search Report, dated Oct. 16, 2017, 5 pages, Europe.

Troy Cook, Calculation of Estimated Ultimate Recovery (EUR) for Wells in Assessment Units of Continuous Hydrocarbon Accumulations Total Petroleum System and Assessment of Coalbed Gas in the Powder River Basin Province, Wyoming and Montana, by USGS Powder River Basin Province, May 4, 2004, 9 pages, Chapter 7, ISBN-0-607-98080-X, U.S. Geological Survey Digital Data Series DDS-69-C, Denver, Colorado.

* cited by examiner

RANKING DRILLING LOCATIONS AMONG SHALE PLAYS

PRIORITY APPLICATION

This application is a U.S. National Stage Filing under 35 U.S.C. 371 from International Application No. PCT/US2014/024596, filed on 12 Mar. 2014, and published as WO 2015/137943 A1 on 17 Sep. 2015, which applications and publication are incorporated herein by reference in their entirety.

BACKGROUND

Planning resource and capital allocations among oil and gas-producing wells and oil and gas-producing areas is important to the financial health of oil and gas exploration and production corporations. Corporations may make measurements in an attempt to forecast drilling results of new well locations to aid in this planning.

Available methods for determining new well locations rely on the production history of existing wells to forecast drilling results of new wells. However, evidence indicates that new wells drilled near existing shale wells often do not replicate the existing wells' production performance. Accordingly, corporations utilizing available methods may drill many disappointing wells, resulting in losses and misallocation of resources.

DETAILED DESCRIPTION

To address some of the challenges described above, as well as others, apparatus, systems, and methods are described herein to rank drilling locations between leaseholds, basins, and shale plays, allocate capital and other resources, and plan development programs to more fully utilize lease holdings in two or more distinct shale plays, shale basins, or sub-areas thereof.

Available methods for determining new well locations in shale plays involve drilling near existing production wells. Operators may study the production history of existing wells, for time periods of not less than six months, to build a representative local production quality map of existing wells. However, offset wells drilled near existing wells often do not replicate the existing wells' production performance in shale plays. Consequently, forecasting of drilling results based on the production history of existing wells has been unreliable, leading to the drilling of many disappointing wells.

Furthermore, if a corporation owns leaseholds in multiple shale plays, the corporation may wish to allocate drilling and technical resources among those shale plays. Properties for ranking drilling locations within a shale play may still be important for ranking drilling locations among shale plays, but the relative importance of the different properties may change based on whether the ranking is to occur within a shale play, or between shale plays. Additionally, some properties may be important when ranking drilling locations between shale plays that are less important, or unimportant, when ranking drilling locations within a shale play. For example, the geographical area of leaseholds held by a corporation in a shale play, and properties such as shale maturity, shale depth and shale thickness of a shale play, may be important for ranking drilling locations between shale plays while, in contrast, these properties or measurements may not be important for ranking leaseholds within one shale play.

For example, shale thickness will typically not have a large variation within a leasehold, but shale thickness can vary widely between shale plays so that shale thickness measurements are correspondingly more important when ranking leaseholds between shale plays. Shale thickness measurements can be important for production metrics, described herein, because shale thickness measurements give an indication of the volumetric potential for hydrocarbon in the shale that operators can drill, stimulate, and produce.

As another example, a measurement of the shale depth may be important to ensure that shale depth is within a range such that well production is economically feasible. Shale must be sufficiently deep to provide adequate reservoir energy to force hydrocarbon out of the shale at a sufficient rate that operators find it economically feasible or advantageous to operate a well at that depth. However, if the shale is too deep the cost of drilling the well to access the shale is high, and this can decrease the economic value of the hydrocarbon production.

As an additional example, a measurement of the geographical area owned by a corporation in a shale play or other area may be important when deciding how much capital to allocate to production in a shale play or other larger area. Measurements of geographical area, when combined with measurements for shale thickness and shale maturity, provide an indication of the form and amount of hydrocarbon that is available in a shale play or other area for the corporation to produce.

As another example, rock maturity will typically not have a large variation within a leasehold, but rock maturity can vary widely between shale plays so that rock maturity data is correspondingly more important when ranking leaseholds between shale plays. Results of rock maturity measurements can indicate how long the shale in that area has been heated (e.g., "cooked"), which in turn can indicate whether the shale will produce oil or gas, or what type of oil or gas the shale will produce.

Some embodiments use measurements of shale maturity, shale thickness, shale depth and leasehold geographical area, in addition to measurements of other rock properties such as total organic content (TOC), porosity, hydrocarbon saturation, and brittleness, to perform quantitative comparisons of drilling programs between leaseholds in different basins and plays to allow allocations of resources among drilling locations.

Figure 1:
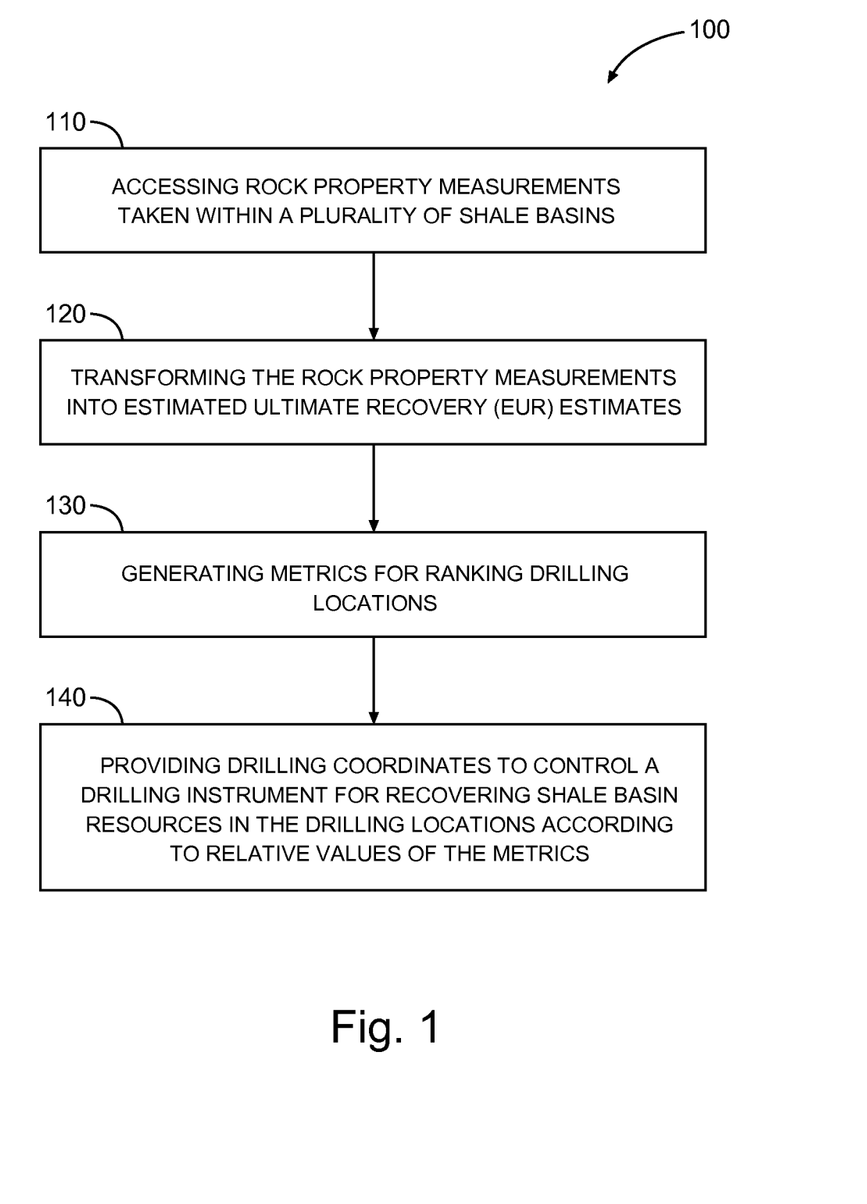
FIG. 1 is a flowchart illustrating a method for ranking drilling locations of shale plays in accordance with some embodiments.

FIG. 1 is a flowchart illustrating a method 100 for ranking drilling locations in a shale play in accordance with some embodiments. A processor 1020 (FIG. 10) or other system can perform operations of the method 100.

The example method 100 starts at block 110 with accessing rock property measurements taken within a plurality of shale basins. The rock property measurements can include, for example, rock maturity measurements, total organic content measurements, and brittleness.

Figure 2:
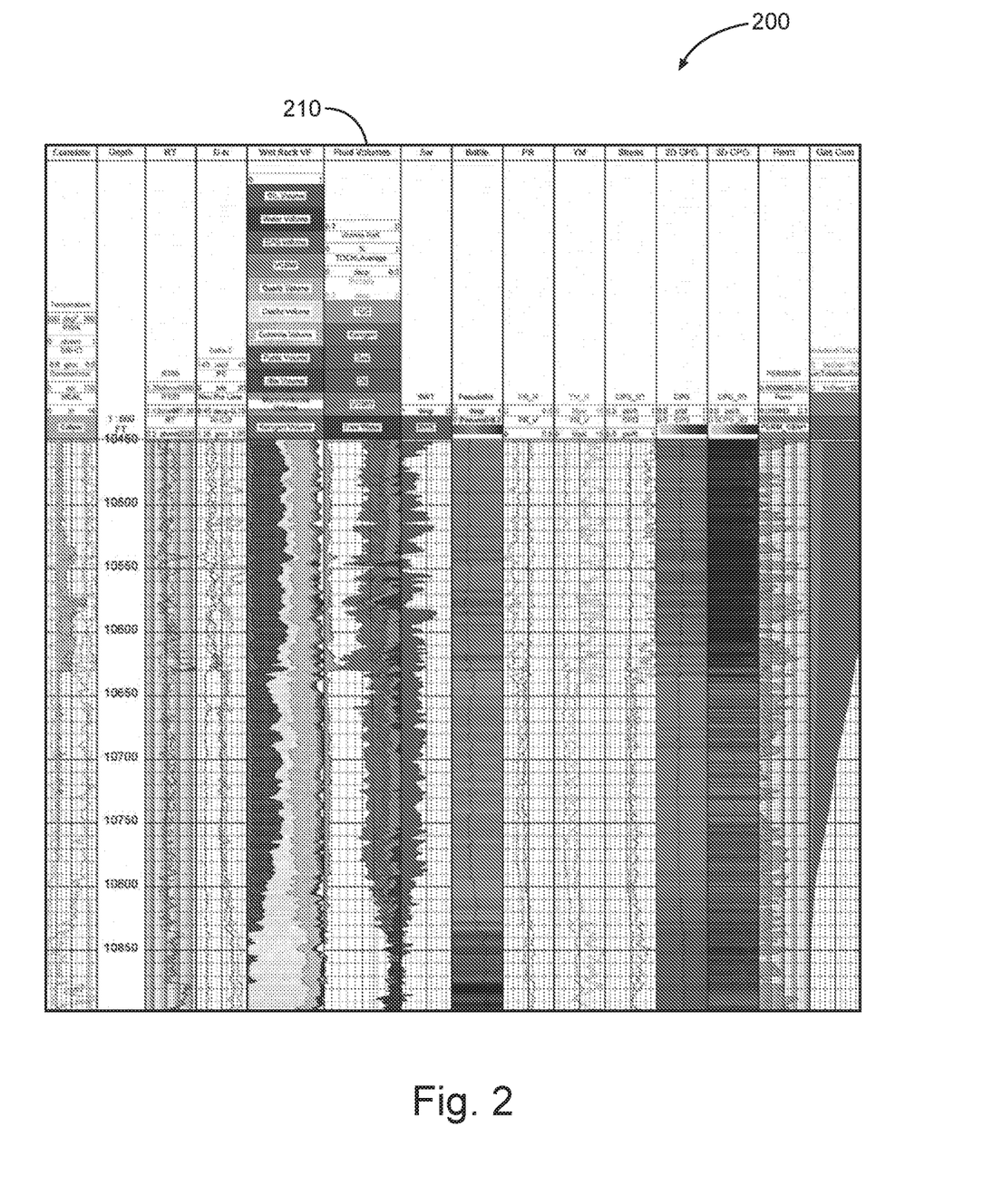
FIG. 2 is an example well log illustrating the results of accessing rock property measurements at one well in accordance with some embodiments.
Figure 3:
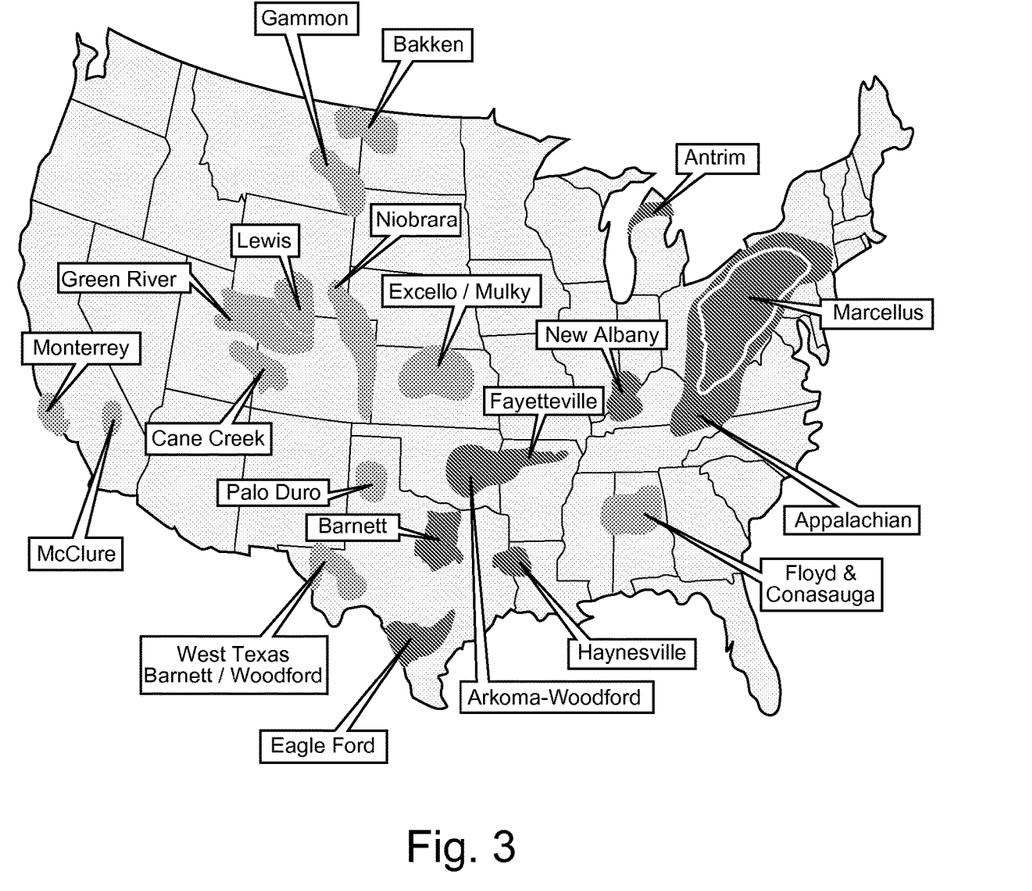
FIG. 3 illustrates United States shale plays in which drilling locations can be ranked in accordance with some embodiments.

FIG. 2 is an example well log 200 illustrating the results of accessing rock property measurements at one well. Similar well logs may be captured at different shale basins or different wells spaced by a certain distance within one shale basin. Shale basins can be included in different shale plays, for example, Bakken, Barnett, Marcellus, or other shale plays, as illustrated in FIG. 3. While some embodiments described regarding ranking of drilling locations among shale basins, it will be understood that ranking in accordance with some embodiments can occur between locations in different shale plays or within different drilling locations or leaseholds within a shale basin or a shale play, or between larger areas of a shale play.

Referring again to FIG. 2, rock maturity can be determined by using measurements in the Fluid Volumes column 210 of the well log 200, which indicates computed vitrinite reflectance of the rock by depth. This measurement of vitrinite reflectance can be used to define rock maturity, and the measurement can be confirmed by laboratory measurements on core samples. The well log 200 can include data concerning measurements of other rock properties, for example brittleness, for use in some embodiments. However, the well log 200 can include measurements for any parameter or property.

Figure 4:
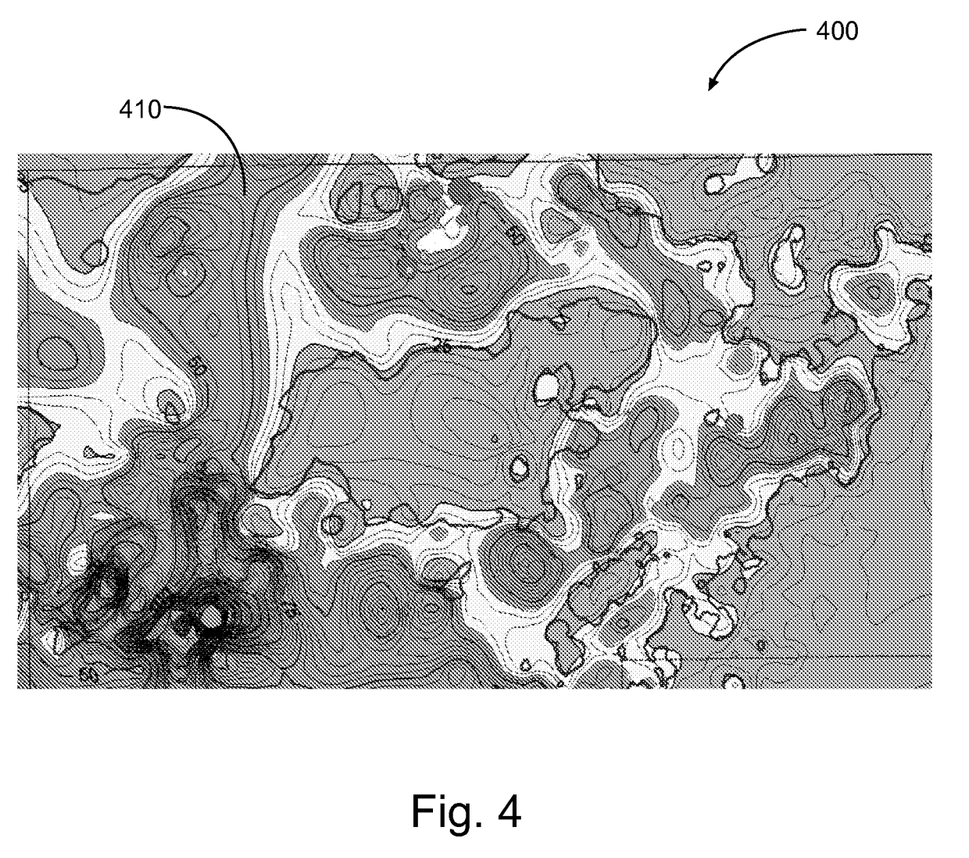
FIG. 4 is an example contour map for use in identifying gross variations in rock properties in accordance with some embodiments.
Figure 10:
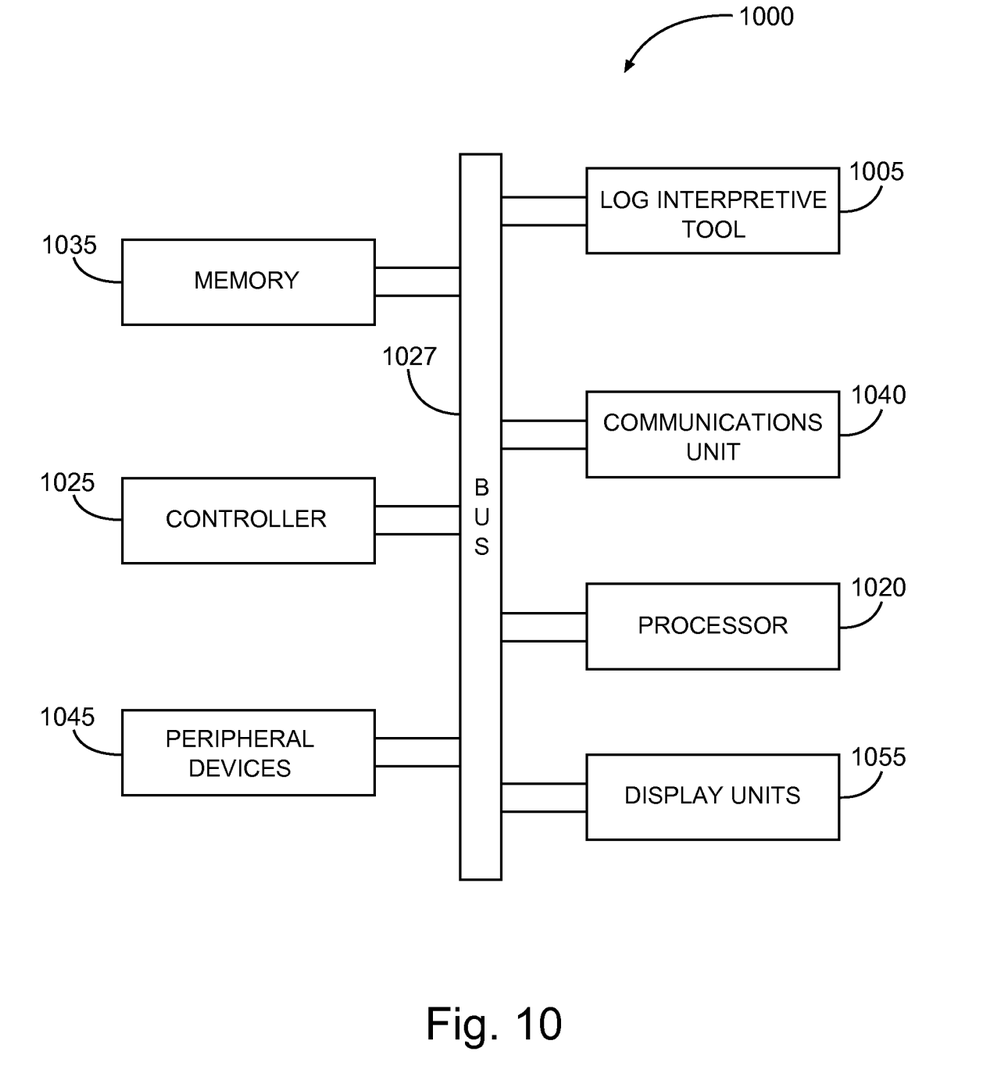
FIG. 10 is a block diagram of a computer system for implementing some embodiments.

In some embodiments, the processor 1020 can rank candidate locations in the plurality of shale basins at which to access rock property measurements based on topography of contour maps of geographical areas that include at least one of the drilling locations in each of the plurality of shale basins. The contour maps can include information concerning rock properties to identify gross variations in rock properties as a function of the basin architecture. FIG. 4 is an example contour map 400 for use in identifying gross variations in rock properties in accordance with some embodiments. In these or other embodiments, a processor 1020 or other system can provide coordinates for the candidate locations to control measurement instruments to perform measurements at the candidate locations, based on ranks of candidate locations. The processor 1020 may also select candidate locations based on the location of the operators' assets within the shale basin.

A contour map, which may be similar to the contour map 400 in FIG. 4, can be used to identify areas, for example area 410, of high water saturation in the target shale facies. High water saturations can imply relatively low hydrocarbon saturation. In turn, drilling locations with relatively low hydrocarbon saturation will be economically less attractive to operators. Some available systems may rely on solely this water saturation information provided within the contour map 400, or on other single-property contour maps, to rank drilling locations, and such reliance can lead to poor decision-making and misallocation of resources. Embodiments described herein provide additional methodologies and combinations of properties to improve ranking decisions to provide enhanced allocation of capital resources.

Figure 5A:
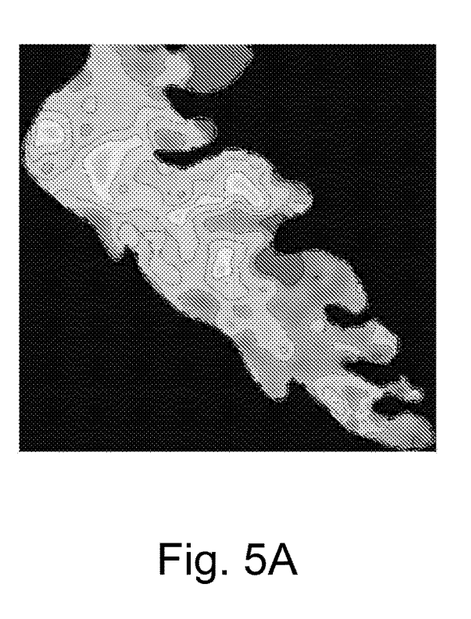
FIG. 5A illustrates an example of a thickness property map for ranking drilling locations of shale plays in accordance with some embodiments.
Figure 5B:
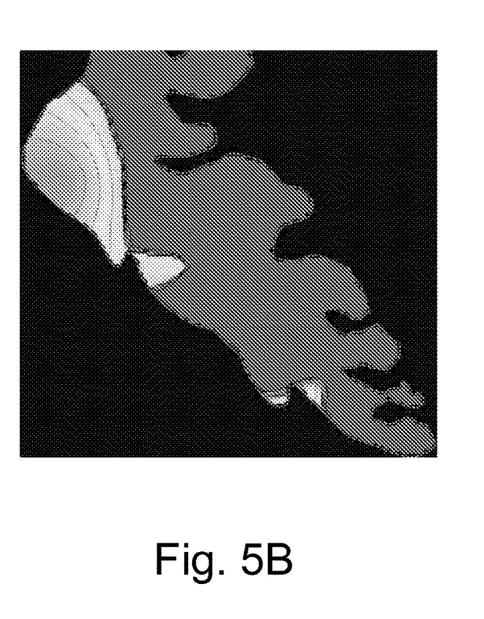
FIG. 5B illustrates an example of a shale maturity property map for ranking drilling locations of shale plays in accordance with some embodiments.

As described herein, the operator may use tools to measure, or have access to measurements, of some properties such as thickness and shale maturity. FIG. 5A illustrates an example of a thickness property map for ranking drilling locations of shale plays in accordance with some embodiments, and FIG. 5B illustrates an example of a shale maturity property map for ranking drilling locations of shale plays in accordance with some embodiments. As described herein, the results of measurements of thickness and shale maturity can be important for ranking leaseholds between shale plays while, in contrast, the result of such measurements may not be important for ranking leaseholds within one shale play.

Figure 6:
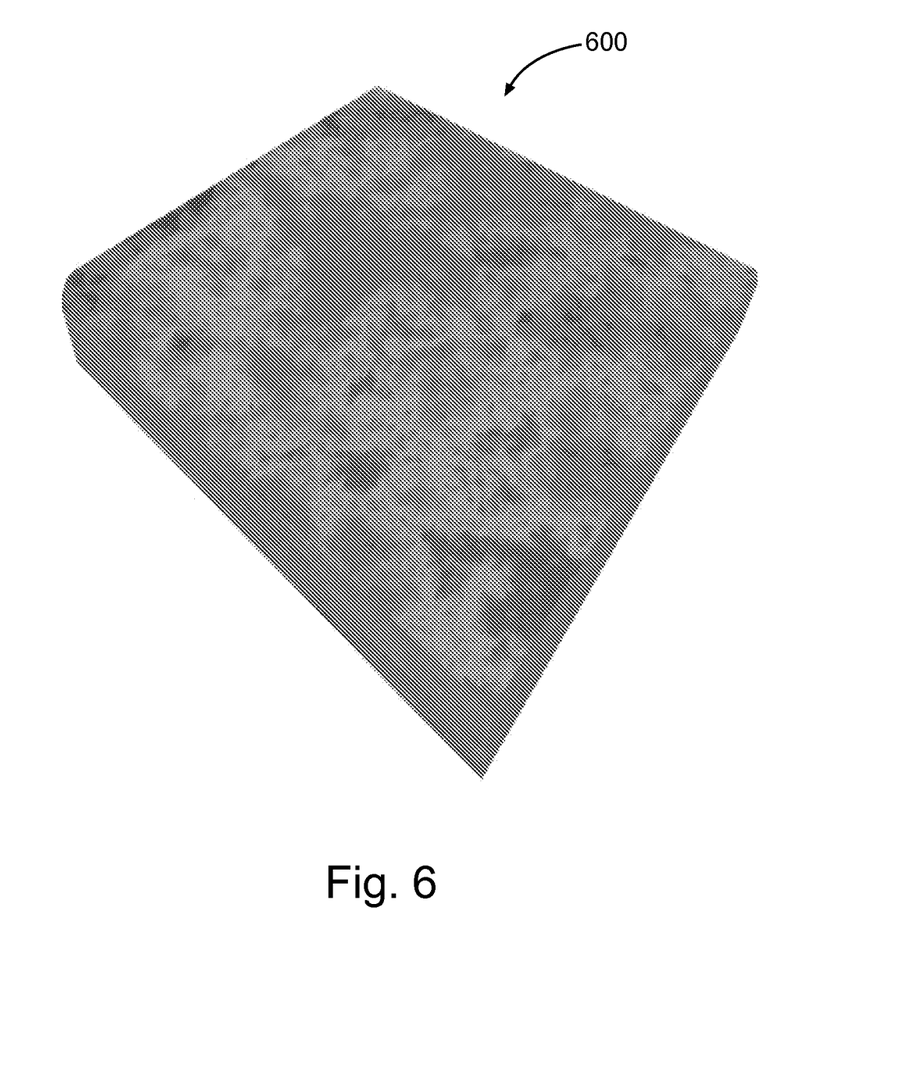
FIG. 6 illustrates an example probability map for rock property metrics over one area in accordance with some embodiments.

The processor 1020 can perform geostatistics using measurements provided by well logs or other operator assets at the candidate locations to create a probability map over one or several areas. Geostatistics of the shale property quality estimates define a mean and standard deviation of shale properties in the drilling locations, such as an operators' leasehold area, the forecasted production potential of drilling locations. FIG. 6 illustrates an example probability map 600 for rock property metrics over one area. The processor 1020 can generate same or similar probability maps over other areas at which measurements are taken at candidate locations. The probability map 600 can include probabilities for a multiplicity of rock properties that are important for ranking drilling locations in a smaller area. As described herein, the probability map 600 can illustrate probabilities for properties other than shale maturity or thickness, including brittleness, TOC, porosity, etc.

Referring once again to FIG. 1, the example method 100 continues at block 120 with transforming the rock property measurements into Estimated Ultimate Recovery (EUR) estimates for wells operating within the plurality of shale basins. It will be appreciated by those of ordinary skill in the art that EUR estimates provide an approximation of the quantity of oil or gas that is potentially recoverable or has already been recovered from a reserve or well. EUR estimates can be created from production type curves according to methods understood by those of ordinary skill in the art. Production type curves provide the basis for economic analysis of drilling opportunities by providing production sales volumes as a function of time over the life of the well. The production type curve and EUR estimates can further be based on values for shale thickness, porosity, and hydrocarbon saturation measured within the plurality of shale basins.

Figure 7:
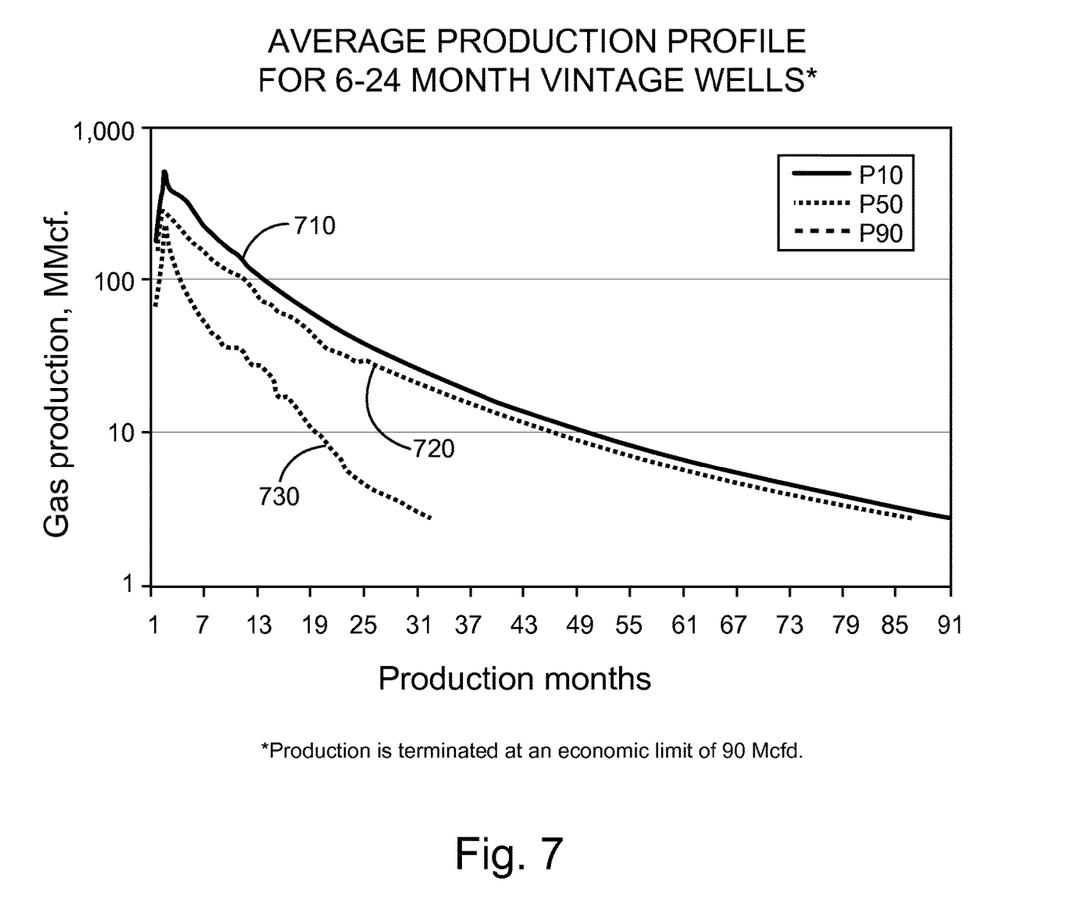
FIG. 7 illustrates example production type curves for a shale gas formation in accordance with some embodiments.

FIG. 7 illustrates example production type curves, generated according to various embodiments, for a shale gas formation including a plot 710 for $P_{10}$, a plot 720 for $P_{50}$, and a plot 730 for $P_{90}$. As will be appreciated by those of ordinary skill in the art, $P_{10}$ refers to a 10% certainty that production occurs according to the $P_{10}$ curve. $P_{50}$ refers to a 50% certainty that production occurs according to the $P_{50}$ curve. $P_{90}$ refers to a 90% (e.g., a "reasonable certainty") that production occurs according to the $P_{90}$ curve. For the purposes of this document, a probability of 90% or better (e.g. P90-100) is defined as a reasonable certainty. The example production type curves illustrate production trends for a time period extending 91 months. However, it will be understood that any amount of time can be illustrated.

Figure 8:
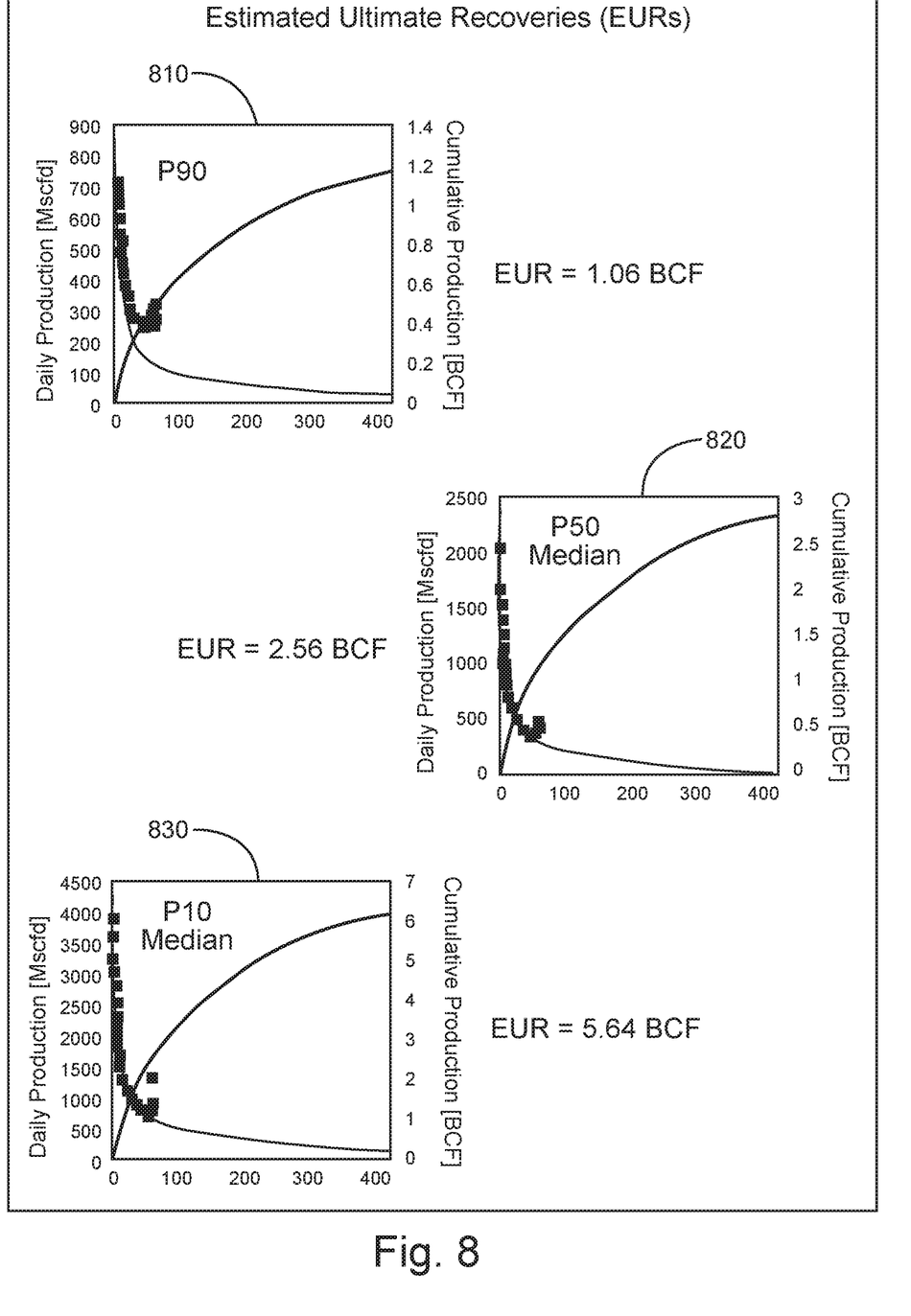
FIG. 8 illustrates example EURs for various trend cases such illustrated in the production type curves of FIG. 7.

FIG. 8 illustrates example EURs for various trend cases such illustrated in the production type curves of FIG. 7. For example, FIG. 8 shows a plot 810 for P90 where daily production falls from about 900 million standard cubic feet per day (Mscfd) to less than about 100 Mscfd over about 400 months; a plot 820 for P50 where daily production falls from about 2000 Mscfd to less than about 100 Mscfd over about 400 months; and a plot 830 for P10 where daily production falls from about 4000 Mscfd to less than about 100 Mscfd over about 400 months. Also shown in each of the plots 810, 820 and 830 is EUR where P90 has a EUR of about 1.06 billion cubic feet (BCF), P50 has a EUR of about 2.56 BCF, and P10 has a EUR of about 5.64 BCF. Such values may help determine which scenario, P10, P50, or P90, may be economically viable, if any.

The example method 100 continues at block 130 with generating metrics for ranking drilling locations. The drilling locations will include one or more of the wells for which the processor 1020 generated EUR estimates. The processor 1020 will generate at least one of the metrics based on the EUR estimates generated at block 120. The EUR estimates can include one or more of $P_{10}$, $P_{50}$, and $P_{90}$ EUR estimates.

The generated metrics can include production metrics for the drilling locations based on predicted production rates for the wells and further based on the rock property measurements and the values for shale thickness. Production metrics can include economics, cash flow, and capital efficiency metrics. The processor 1020 can generate production metrics by estimating costs for completing wells to produce a selected level of production within a drilling location based on the measurements of geographical area. The costs can include capital costs to drill and complete wells and to fracture wells to maximize production performance in each shale play, shale basin, or sub-area thereof. In some embodiments, the processor 1020 can generate production metrics by solving a nonlinear programming problem with the selected level of production as the objective function.

The processor 1020 can generate production rate forecasts for wells yet to be drilled. The processor 1020 can generate such production rate forecasts by solving a nonlinear programming problem with rock properties, shale thickness, and capital investment levels as input variables, and with production targets as the objective function.

The processor 1020 can use a correlation function, according to mathematical methods understood by those of ordinary skill in the art, which relates the production histories of existing wells with corresponding shale quality point estimates, to determine a correlation for production performance. By combining the geostatistics-derived intra-well shale property quality and the correlation for production performance, the processor 1020 can construct a forecast of aggregate production performance for the leasehold as a function of well location and the number of wells required to produce the hydrocarbon in place. This will be a distribution of outcomes reflecting the variation of properties within the area.

The generated metrics can additionally include reserve estimation metrics for the drilling locations based on the EUR estimates, on the rock property measurements, and on measurements of geographical area for the drilling locations. The processor 1020 can generate reserve estimation metrics by estimating undeveloped resources in the drilling locations according to a solution for a nonlinear programming problem with at least one of the EUR estimates as the objective function.

Example method 100 continues at block 140 with providing drilling coordinates to control a drilling instrument for recovering shale basin resources in the drilling locations according to relative values of the metrics.

In some embodiments, the processor 1020 can generate a ranked list of drilling locations. The processor 1020 can order the ranked lists according to the metrics that the processor 1020 generated at block 130. A first drilling location with a first rank in the ranked list can be located within a different shale basin than a second drilling location with a second rank in the ranked list, although embodiments are not limited thereto. A ranking can be similar to that shown in Table 1, below:

TABLE 1

| Shale Play | Leasehold Identifier | Rank |
|---|---|---|
| Bakken | Lot 1, Section 4 | 1 |
| Bakken | Lot 1, Section 10 | 2 |
| Barnett | Lot 17, Section 42 | 3 |
| Marcellus | Lot 7, Section 17 | 4 |
| Gammon | Lot 5, Section 12 | 5 |

In accordance with embodiments described above, the processor 1020 can rank drilling locations according to the aggregate production performance forecast. Planning advisors can then compare rankings of opportunities across their holdings within a single shale play or across different plays to devise a capital allocation plan to help meet corporate financial goals.

Figure 9:
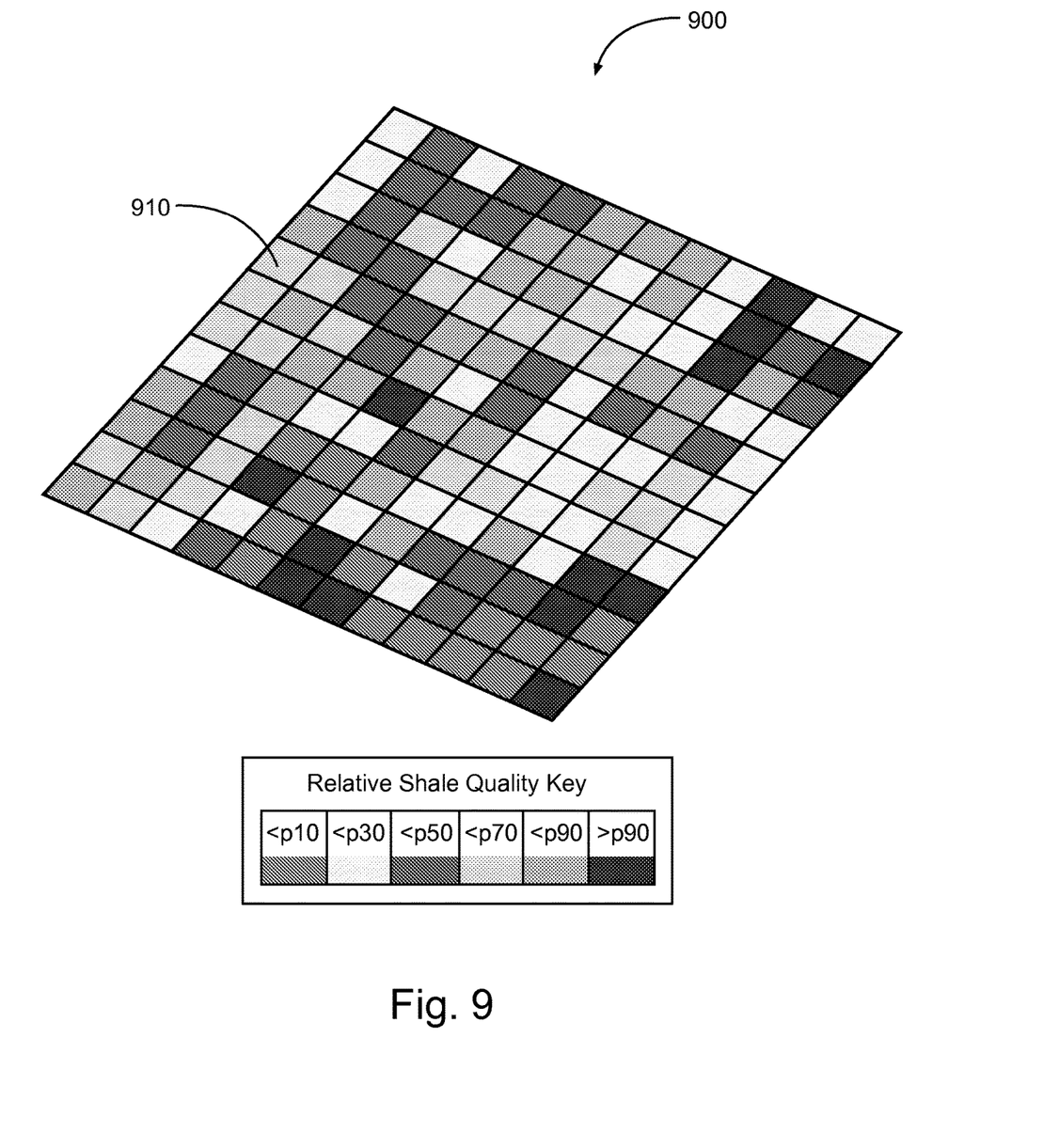
FIG. 9 is an example graph illustrating the relative shale quality of a multiplicity of geographical sections of a basin.

The processor 1020 can perform other ranking, within high-ranking leaseholds, to select specific drilling locations and target depths for landing horizontal wells and placing fracture treatments in the horizontal portion of the well. For example, data captured from a few wells within one leasehold can be used to generate a geostatistical model similar to FIG. 6 over a leasehold. The processor 1020 can rank geographical sections of a leasehold according to a criterion such as mean shale quality values to determine a probability as to whether a well, drilled in a particular geographical section, would be economically productive. FIG. 9 is an example graph illustrating the relative shale quality of a multiplicity of geographical sections 910 of a leasehold. In FIG. 9, geographical sections 910 are assigned categories based on the relative reward, based on the probability p10, p30, p50, p70, and p90 of production potential in each geographical section 910. However, embodiments are not limited to such categorization.

FIG. 10 depicts a block diagram of features of a system 1000 in accordance with various embodiments. The system 1000 can rank drilling locations within or among shale plays as described above.

The system 1000 includes a log interpretive tool 1005 such as a Halliburton ShaleXpert™ available from the Halliburton Company of Houston, Tex.

The system includes a processor 1020. The log interpretive tool 1005 can execute on the processor 1020 or on another processor (not shown in FIG. 10) of the system 1000.

The system 1000 can additionally include a controller 1025 and a memory 1035. The controller 1025 can operate to provide drilling coordinates to control a drilling instrument for recovering shale basin resources in drilling locations according to relative values of metrics as described herein, or the system 1000 can provide these coordinates to another system (not shown in FIG. 10) for controlling a drilling instrument. The memory 1035 can store the rock property measurements and regional contour maps of geographical areas that include at least one of the drilling locations of each of the plurality of shale basins. The processor 1020 can access these or other regional contour maps for determining where to take measurements as described herein, for example, or for other purposes.

The communications unit 1040 can provide downhole communications in a drilling operation, although such downhole communications can also be provided by any other system located at or near drilling coordinates of a surface of the Earth where drilling will take place. Such downhole communications can include a telemetry system.

The system 1000 can also include a bus 1027, where the bus 1027 provides electrical conductivity among the components of the system 1000. The bus 1027 can include an address bus, a data bus, and a control bus, each independently configured. The bus 1027 can also use common conductive lines for providing one or more of address, data, or control, and the controller 1025 can regulate usage of these lines. The bus 1027 can include instrumentality for a communication network. The bus 1027 can be configured such that the components of the system 1000 are distributed. Such distribution can be arranged between downhole components and components that can be disposed on the surface of a well. Alternatively, various ones of these components can be co-located, such as on one or more collars of a drill string or on a wireline structure.

In various embodiments, the system 1000 comprises peripheral devices 1045 that can include displays, user input devices, additional storage memory, and control devices that may operate in conjunction with the controller 1025 or the memory 1035. For example, the peripheral devices 1045 can include a user input device to receive user input responsive to providing display data representative of the ranking of drilling locations of shale plays as determined by the system 1000 or for data related to operations such as drilling operations. The peripheral devices 1045 can include a display for displaying a ranked list of the drilling locations, wherein the processor 1020 has ordered the ranked list according to the production metrics, reserve metrics, or other metrics described herein. The display can display drilling coordinates to control a drilling instrument for recovering shale basin resources in drilling locations according to relative values of metrics as described herein.

In an embodiment, the controller 1025 can be realized as one or more processors. The peripheral 1045 can be programmed to operate in conjunction with display unit(s) 1055 with instructions stored in the memory 1035 to implement a graphical user interface (GUI) to manage the operation of components distributed within the system 1000. A GUI can operate in conjunction with the communications unit 1040 and the bus 1027.

In various embodiments, a non-transitory machine-readable storage device can comprise instructions stored thereon, which, when performed by a machine, cause the machine to perform operations, the operations comprising one or more features similar to or identical to features of methods and techniques described herein. A machine-readable storage device, herein, is a physical device that stores data represented by physical structure within the device. Examples of machine-readable storage devices can include, but are not limited to, memory 1035 in the form of read only memory (ROM), random access memory (RAM), a magnetic disk storage device, an optical storage device, a flash memory, and other electronic, magnetic, or optical memory devices, including combinations thereof.

One or more processors such as, for example, the processing unit 1020, can operate on the physical structure of such instructions. Executing these instructions determined by the physical structures can cause the machine to perform operations to access rock property measurements taken within a plurality of shale basins, the rock property measurements including rock maturity measurements, total organic content measurements, and brittleness measurements; to generate Estimated Ultimate Recovery (EUR) estimates for wells operating within the plurality of shale basins based on the rock property measurements and further based on values for shale thickness, porosity, and hydrocarbon saturation measured within the plurality of shale basins; to generate metrics for ranking drilling locations, the drilling locations including one or more of the wells for which EUR estimates were generated, a first metric of the metrics being based on the EUR estimates; and to provide drilling coordinates to control a drilling instrument for recovering shale basin resources in drilling locations according to relative values of the metrics.

The instructions can include instructions to cause the processing unit 1020 to perform any of, or a portion of, the above-described operations in parallel with performance of any other portion of the above-described operations. The processing unit 1020 can store, in memory 1035, any or all of the data received from the log interpretive tool 1005.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A computer-implemented method of selecting a drilling site among a plurality of shale basins, the method comprising:

accessing, by a processor from a memory coupled to the processor, rock property measurements taken by a downhole tool for a geographical area including the plurality of shale basins, the rock property measurements including values for shale maturity, shale depth, shale thickness, porosity, and hydrocarbon saturation;

determining, by the processor, shale quality estimates for the geographical area, based on the values for the shale maturity, the shale depth, and the shale thickness included in the rock property measurements;

transforming the rock property measurements into Estimated Ultimate Recovery (EUR) estimates for wells operating within the plurality of shale basins, the EUR estimates providing an approximation of a quantity of hydrocarbons recoverable from each well based on the values for the shale thickness, the porosity, and the hydrocarbon saturation measured within the plurality of shale basins;

generating metrics for ranking drilling locations according to a production potential of each drilling location, based on a combination of the EUR estimates and the shale quality estimates, the drilling locations including locations of wells to be drilled within the plurality of shale basins and locations of wells to be drilled between the plurality of shale basins, wherein a different combination of the EUR and the shale quality estimates is used to generate the metrics for ranking the drilling locations within the plurality of shale basins than that used to generate the metrics for ranking the drilling locations between the plurality of shale basins, based on a relative importance of each rock property measurement for ranking corresponding drilling locations;

ranking the drilling locations according to relative values of the metrics generated for the respective drilling locations;

selecting one or more of the drilling locations for drilling operations to be performed with respect to the plurality of shale basins, based on the ranking; and performing the drilling operations by controlling a drilling instrument for recovering shale basin resources at drilling coordinates corresponding to the one or more selected drilling locations.

2. The method of claim 1, wherein the rock property measurements further include total organic content and brittleness.

3. The method of claim 1, wherein generating the metrics includes:

generating production metrics for the drilling locations based on production rate forecasts for the wells and further based on the rock property measurements including the values for the shale thickness; and generating reserve estimation metrics for the drilling locations based on the EUR estimates, on the rock property measurements, and on measurements of the geographical area for the drilling locations.

4. The method of claim 3, wherein generating the production metrics includes estimating costs for completing wells to produce a selected level of production within the drilling locations, based on the measurements of the geographical area.

5. The method of claim 4, wherein generating the production metrics includes solving a nonlinear programming problem with the selected level of production as an objective function.

6. The method of claim 3, wherein generating the reserve estimation metrics includes generating estimates of undeveloped resources in the drilling locations by solving a nonlinear programming problem with at least one of the Eta estimates as an objective function.

7. The method of claim 3, wherein generating the production metrics includes generating production rate forecasts for the wells by solving a nonlinear programming problem with the rock property measurements including the values of the shale thickness, the shale depth, and capital investment levels as input variables, and with production targets as an objective function.

8. The method of claim 1, further comprising:

ranking candidate locations in the plurality of shale basins at which to access rock property measurements based on topography of contour maps of geographical areas that include at least one of the drilling locations in each of the plurality of shale basins; and providing coordinates for the candidate locations to control measurement instruments to perform measurements at the candidate locations, based on ranks of the candidate locations.

9. The method of claim 1, further comprising generating a ranked list of the drilling locations, the ranked list being ordered according to the metrics, and wherein a first one of the drilling locations with a first rank in the ranked list is within a different shale basin of the plurality of shale basins than a second one of the drilling locations with a second rank in the ranked list.

10. The method of claim 1, wherein a shale basin of the plurality of shale basins includes a plurality of leaseholds and wherein two of the drilling locations are within two different ones of the plurality of leaseholds.

11. The method of claim 10, further comprising:

ranking some of the wells located within a single one of the plurality of leaseholds according to a selected criterion.

12. A non-transitory machine-readable storage device having instructions stored thereon which, when performed by a machine, cause the machine to perform operations, the operations comprising:

accessing rock property measurements taken by a downhole tool for a geographical area including a plurality of shale basins, the rock property measurements including total organic content measurements, brittleness measurements, and values for shale maturity, shale depth, shale thickness, porosity, and hydrocarbon saturation;

determining shale quality estimates for the geographical area, based on values for shale maturity, shale depth, and shale thickness included in the rock property measurements;

generating Estimated Ultimate Recovery (EUR) estimates for wells operating within the plurality of shale basins based on the values for the shale thickness, the porosity, and the hydrocarbon saturation measured within the plurality of shale basins, the EUR estimates providing an approximation of a quantity of hydrocarbons recoverable from each well;

generating metrics for ranking drilling locations according to a production potential of each drilling location, based on a combination of the EUR estimates and the shale quality estimates, the drilling locations including locations of wells to be drilled within the plurality of shale basins and locations of wells to be drilled between the plurality of shale basins, wherein a different combination of the RJR and the shale quality estimates is used to generate the metrics for ranking the drilling locations within the plurality of shale basins than that used to generate the metrics for ranking the drilling locations between the plurality of shale basins, based on a relative importance of each rock property measurement for ranking corresponding drilling locations;

ranking the drilling locations according to relative values of the metrics generated for the respective drilling locations;

selecting one or more of the drilling locations for drilling operations to be performed with respect to the plurality of shale basins, based on the ranking; and performing the drilling operations by controlling a drilling instrument for recovering shale basin resources at drilling coordinates corresponding to the one or more selected drilling locations.

13. The non-transitory machine-readable storage device of claim 12 wherein the instructions, when accessed, result in the machine performing:

accessing regional contour maps of geographical areas that include at least one of the drilling locations in each of the plurality of shale basins;

generating a display of the regional contour maps; and receiving a selection of an area of the contour map for which to take the rock property measurements.

14. The non-transitory machine readable storage device of claim 12, wherein the instructions, when accessed, result in the machine performing:
  generating a ranked list of the drilling locations, the ranked list being ordered according to the metrics; and
  publishing the ranked list on a display.

15. The non-transitory machine-readable storage device of claim 12 wherein the instructions, when accessed, result in the machine performing:
  generating production metrics for the drilling locations based on production rate forecasts for the wells and further based on the rock property measurements including the values for the shale thickness; and
  generating reserve estimation metrics for the drilling locations based on the EUR estimates, on the rock property measurements, and on measurements of geographical area for the drilling locations.

16. The non-transitory machine-readable storage device of claim 15 wherein the instructions, when accessed, result in the machine performing:
  estimating costs for completing the wells to produce a selected level of production within a drilling location, based on the measurements of the geographical area; and
  solving a nonlinear programming problem with the selected level of production as an objective function.

17. A system comprising:
  one or more processors; and
  a memory coupled to the one or more processors, the memory including processor-readable instructions, which, when executed by the one or more processors, causes the one or more processors to:
  access, from the memory, rock property measurements taken for a geographical area including a plurality of shale basins, the rock property measurements including values for shale maturity; shale depth, shale thickness, porosity, and hydrocarbon saturation;
  determine shale quality estimates for the geographical area, based on the values for the shale maturity, the shale depth, and the shale thickness included in the rock property measurements;
  generate Estimated Ultimate Recovery (EUR) estimates for wells operating within the plurality of shale basins based on the values for the shale thickness, the porosity, and the hydrocarbon saturation measured within the plurality of shale basins, the EUR estimates providing an approximation of a quantity of hydrocarbons recoverable from each well;
  generate metrics for ranking drilling locations according to a production potential of each drilling location; based on a combination of the EUR estimates and the shale quality estimates, the drilling locations including locations of wells to be drilled within the plurality of shale basins and locations of wells to be drilled between the plurality of shale basins, wherein a different combination of the EUR and the shale quality estimates is used to generate the metrics for ranking the drilling locations within the plurality of shale basins than that used to generate the metrics for ranking the drilling locations between the plurality of shale basins, based on a relative importance of each rock property measurement for ranking corresponding drilling locations;
  rank the drilling locations according to relative values of the metrics generated for the respective drilling locations;
  select one or more of the drilling locations for drilling operations to be performed with respect to the plurality of shale basins, based on the ranking; and
  control a drilling instrument for performing the drilling operations at the one or more selected drilling locations.

18. The system of claim 17, further comprising a display to display a ranked list of the drilling locations, the ranked list being ordered according to the metrics, and drilling coordinates to control the drilling instrument for recovering shale basin resources at the one or more drilling locations selected from the ranked list of the drilling locations.

19. The system of claim 17, further comprising a control system to receive drilling coordinates corresponding to the one or more selected drilling locations and to control the drilling instrument according to the received drilling coordinates.

* * * * *

UNITED STATES PATENT AND TRADEMARK OFFICE
CERTIFICATE OF CORRECTION

PATENT NO. : 10,718,208 B2
APPLICATION NO. : 15/038251
DATED : July 21, 2020
INVENTOR(S) : Larry Gregg Chorn It is certified that error appears in the above-identified patent and that said Letters Patent is hereby corrected as shown below:

In the Claims

Column 9, Line 46, change "Eta" to -- EUR --

Column 10, Line 41, change "RJR" to -- EUR --

Signed and Sealed this
Nineteenth Day of January, 2021

Andrei Iancu
*Director of the United States Patent and Trademark Office*